United States Patent [19]
Skoyles

[11] 3,708,213
[45] Jan. 2, 1973

[54] ANTI-LOCK BRAKE SYSTEMS
[75] Inventor: Derek Robert Skoyles, East Grinstead, England
[73] Assignee: U.S. Philips Corporation
[22] Filed: June 3, 1970
[21] Appl. No.: 43,157

[30] Foreign Application Priority Data

June 27, 1969 Great Britain......................32,612/69
Aug. 6, 1969 Great Britain......................39,417/69

[52] U.S. Cl............303/21 AF, 188/181 A, 303/21 F
[51] Int. Cl. ...............................................B60t 8/04
[58] Field of Search..................303/6, 61–63, 68–69, 303/21; 188/181

[56] References Cited

UNITED STATES PATENTS

| | | | |
|---|---|---|---|
| 3,449,019 | 6/1969 | Walker | 303/21 F |
| 3,503,655 | 3/1970 | Heimler | 303/21 F |
| 3,514,160 | 5/1970 | Lieber | 303/21 F |
| 3,524,684 | 8/1970 | Skoyles | 303/21 F |
| 3,556,466 | 1/1971 | Machek | 303/21 F |
| 3,556,615 | 1/1971 | Stelzer | 303/21 F |
| 3,567,290 | 3/1971 | Liggett et al. | 303/21 AF |

Primary Examiner—Milton Buchler
Assistant Examiner—John J. McLaughlin
Attorney—Frank R. Trifari

[57] ABSTRACT

An anti-lock vehicle brake system having a fluid pressure source for producing brake fluid under pressure at the wheel brake so as to apply braking pressure to the wheel in response to manual braking action by the operator. Also provided is a wheel movement sensing means for producing an output function in response to a related wheel rotational movement, and an anti-lock control valve actuatable in response to said output function and effective to divert brake fluid from the wheel brake so as to relieve braking pressure and thereby avoid wheel locking. A fail-safe arrangement is connected in the system for by-passing the anti-lock system in the event of malfunction of said anti-lock control valve so as to reapply full brake pressure to the wheel brake. The fail-safe arrangement includes a differential pressure member displaceable between a normal position and an operative position in response to a difference in fluid pressure acting on opposite ends thereof. Two different reference pressures act on different surface areas of the pressure member so that when the brake pressure falls to a critical low value the pressure member will be displaced from its normal position to its operative position in which a by-pass connection is established and fluid pressure is permitted to increase at the brake to restore braking pressure as a result of fluid being passed through the actuated control valve.

6 Claims, 6 Drawing Figures

ANTI-LOCK BRAKE SYSTEMS

This invention relates to anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action (by a person using the brake) causing the brake application. Such systems can be successful in reducing the risk of skidding due to wheel lock and in maintaining directional control during braking, and can also reduce braking distances.

The invention relates more particularly to a fluid-pressure operated anti-lock vehicle brake system, for use in conjunction with a vehicle wheel and associated wheel brake, having a fluid pressure source which in response to a braking action produces at the wheel brake fluid under pressure which causes the brake to apply braking pressure to the wheel, wheel movement sensing means for producing an output function in dependance on a particular criterion related to wheel rotational movement, and control valve means which is arranged for actuation in response to said output function and is effective upon actuation to reduce the pressure of said fluid at the wheel brake and thereby cause braking pressure to be relieved. A suitable criterion — though not the only one — is when the deceleration of the wheel is in excess of a predetermined value.

Normally, the period during which the control valve means remains actuated to relieve braking pressure is very short (i.e., only a few milliseconds), and the control valve means is released at the end of the period to allow braking pressure to increase again. This normal anti-lock operation to relieve braking pressure and then to allow it to increase again is repeated each time the wheel tends towards a locked condition that could result in skidding during a braking action. However, if there is a malfunction preventing the release of the control valve means following its actuation, then braking pressure would not be increased again by normal anti-lock operation and could continue to fall. Therefore, unless a fail-safe arrangement of some form is provided, which is effective in the event of such a malfunction to over-ride the action of the control valve means and thereby allow brake application to be restored, a complete brake failure could result.

Such a fail-safe arrangement may be arranged to become effective in the event that braking pressure falls below a predetermined minimum "fail-safe" value which would be indicitive of the abovementioned malfunction. However, in order that an anti-lock vehicle brake system should allow braking pressure reduction sufficient to unlock a road wheel on a very slippery surface (e.g., ice), a very low fail-safe value of braking pressure would have to be selected, below which the fail-safe arrangement becomes effective.

The present invention is based on the realization that if an absolute fail-safe value of braking pressure is chosen, there is a danger that due to deterioration in the optimum performance of an anti-lock vehicle brake system (e.g., due to "sticking" of anti-lock mechanisms thereof), this absolute value may never be reached even though the abovementioned malfunction causes the braking pressure to become dangerously low. In other words, the fail-safe arrangement may remain unresponsive to the malfunction.

With a view to avoiding this danger the present invention provides an anti-lock vehicle brake system of the character referred to, wherein there is inlcued a fail-safe arrangement comprising means which is connected to be subjected to fluid pressure of value corresponding to braking pressure value and is responsive to the fluid pressure applied to it falling to a datum value, due to prolonged actuation of said control valve means, to over-ride the action of the latter to allow full brake application to be restored, together with means for automatically varying said datum value such that it is always slightly greater than the lowest value of braking pressure which the system would otherwise produce with the control valve means actuated. In this way, reliance on an absolute value of fail-safe pressure is avoided. In a system in which locking value of braking pressure (i.e., the value that would lock a road wheel on a good surface) is approximately 1,500 p.s.i. and the lowest value of braking pressure that the system can sustain with the control valve means actuated is approximately 50 p.s.i., a typical datum value of braking pressure may be approximately 1 percent or less of the locking value (i.e., 15 p.s.i.) above the lowest value of braking pressure.

In carrying out the invention in respect of an anti-lock vehicle brake system of the character referred to wherein the control valve means is connected to or in a pressure line for supplying fluid under pressure to the brake and is effective when actuated to divert fluid from said pressure line to relieve braking pressure, the fail-safe arrangement may comprise differential means arranged for displacement in one direction in response to fluid pressure of braking value to seal a by-pass connection which extends between the fluid pressure source of the system and the control valve means, said differential means being also arranged for displacement in the opposite direction to unseal said by-pass connection in response to the combined value of the pressure of said diverted fluid and fluid pressure from said source when the effective force exerted by said combined value on said differential means exceeds that exerted by the fluid pressure of braking value thereon. In a preferred embodiment of the invention, the fail-safe arrangement includes means for preventing fluid pressure from said source becoming effective for displacing said differential means until flow of fluid under pressure from said source, to exert fluid pressure of braking value at the brake, has ceased.

Whereas, the fail-safe arrangement according to the present invention as so far described is thought to provide satisfactory operation for a wide range of road surface conditions, it may not give an optimum performance for a very slippery (e.g., wet ice) surface. The reason for this is that the means therein which is responsive when braking pressure falls to said datum value takes no account of the time taken for the wheel to recover speed. It is known from an understanding of the essential requirements for anti-lock braking generally, that as soon as there is a tendency for a braked wheel to lock (due to excessive braking having regard to the prevailing road conditions), braking pressure is relieved until the wheel is rolling again and is then re-applied. In the case where there is good adhesion between the wheel and the road surface, the wheel accelerates again quickly. On the other hand, the wheel would take a much longer time to reach the free rolling condition again on a very slippery road surface. During such longer time, the braking pressure could fall to said datum value, even though there is no malfunction of the control valve means, in which case the fail-safe arrangement would become responsive spuriously to re-apply braking pressure. The result of this is that the braking pressure could be re-applied suddenly to a wheel which is attempting to accelerate from a lower speed on a slippery surface.

In order to prevent the possibility of such a spurious response, the present invention further provides in conjunction with the fail-safe arrangement, restrictor means for causing braking pressure to which the fail-safe arrangement is responsive to fall at a slower rate than the rate at which braking pressure falls at the brake to relieve braking pressure when the control valve means of the system is actuated.

The slower rate of fall of braking pressure to which the fail-safe arrangement is responsive would be so chosen that any deterioration of fail-safe performance for a good road surface would be minimized. There might be some deterioration because, as aforesaid, on a good road surface a freed wheel will become free rolling again quickly, which means that actuation of the control valve means is for a short period only. Therefore, for a good road surface, a period of time constituting a prolonged actuation of the control valve means could be very slightly shorter than the period of time required for the slower rate of fall of braking pressure needed to give optimum fail-safe performance for a very slippery road surface. However, it is envisaged that an overall improvement in fail-safe performance would be achieved, since this instance of failure would be very rare.

In the case, as aforesaid, of a system in which the control valve means is connected to or in a pressure line for supplying fluid under pressure to the brake and the fail-safe arrangement comprises differential means, said restrictor means can comprise one-way valve means in a pressure line to which said differential means is connected to receive fluid pressure of braking value for displacement in said one direction, together with a restrictor element connected in a fluid connection in parallel with said one-way valve means, the latter being so arranged as to permit fluid pressure of braking value to pass to said differential means, but to prevent such fluid pressure being relieved from the differential means, the relieving of this fluid pressure being through the restrictor element at a rate determined thereby. The restrictor means may be, equivalently, a "leaky" one-way valve connected in said fluid connection.

In order that the invention may be more fully understood, reference will now be made by way of example to the drawings in which.

Figure 1:
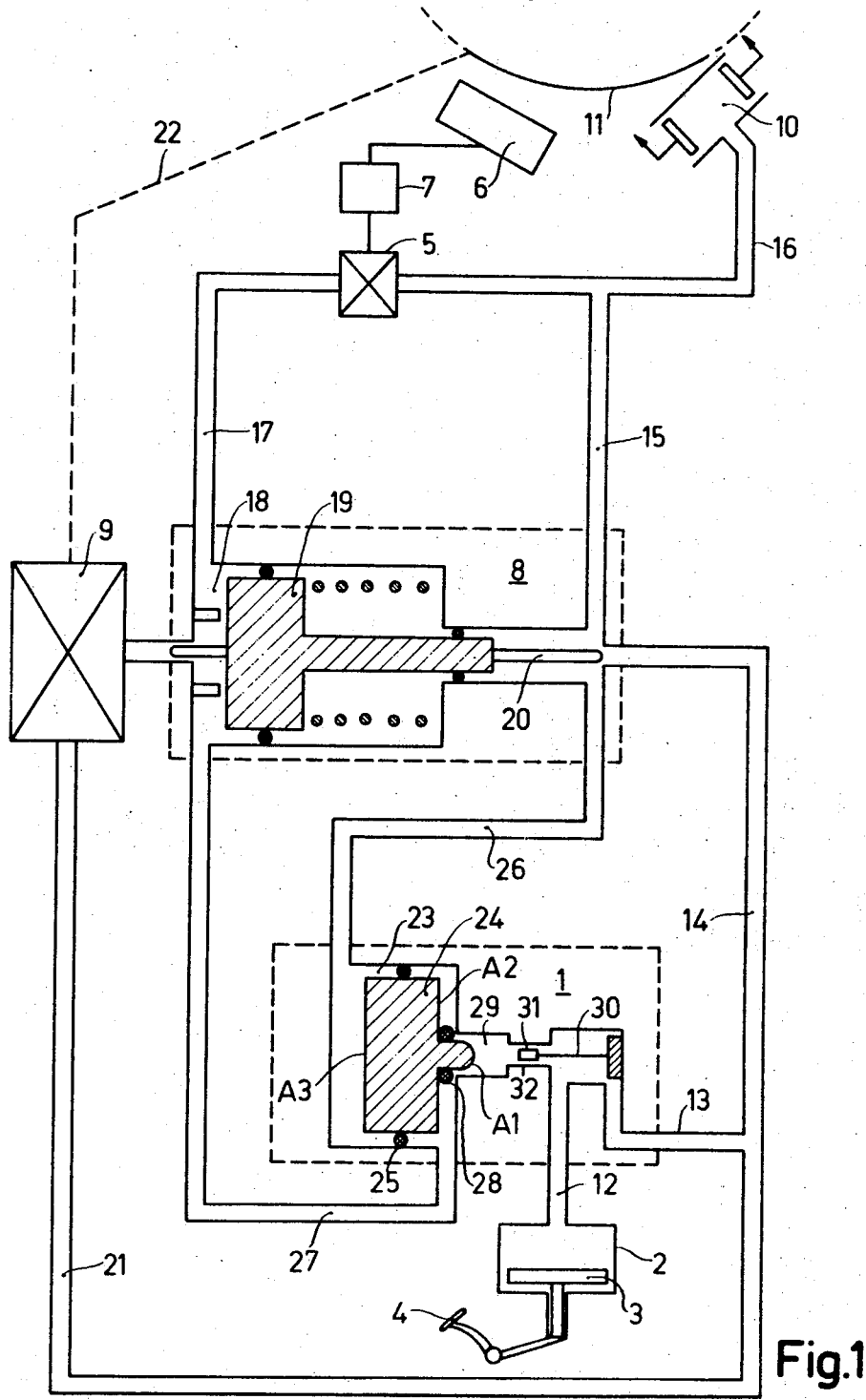
FIGS. 1 to 4 show diagrammatically respective different forms of anti-lock vehicle brake system of the character referred to each including a fail-safe arrangement in accordance with the invention.

Referring to the drawings, in FIG. 1 a fail-safe arrangement 1 is provided in a particular form of anti-lock vehicle brake system which is described in greater detail than herein in co-pending U.S. Pat. application Ser. No. 881,460, filed Dec. 2, 1969 now abandoned. This system is a master cylinder type hydraulic system comprising a master cylinder 2 having a piston 3 which is actuable by a brake pedal 4. The system further comprises an anti-lock control valve 5, a wheel movement sensor 6, an electrical control arrangement 7, a variable restrictor element 8 and a scavenging pump 9. A vehicle brake 10 for a wheel 11 is controlled by this system.

In operation of the system of this FIG. 1 for normal brake application, fluid in pressure lines 12 to 16 is pressurized by the master cylinder 2 to an extent determined by a driver's braking action and this produces a corresponding braking pressure in the brake 10. If the driver's braking action is likely to cause skidding due to the wheel locking, this is detected by the wheel movement sensor 6 and electrical control arrangement 7, and the control valve 5 is actuated. Details of the manner of operation and composition of the elements 5, 6 and 7 are not thought to be necessary for an understanding of the present invention, but an example is given in the aforementioned co-pending application.

As a result of the actuation of the control valve 5, some of the fluid under pressure in the pressure lines 15 and 16 is diverted into a pressure line 17, thereby relieving braking pressure. This diverted fluid enters a reservoir 18 of the variable restrictor element 8 where it is applied behind a spring-loaded plunger 19 and displaces this plunger to the right (as seen in the drawing), so that a restrictor 20 on the plunger 19 enters the pressure line 14, thereby restricting flow of fluid through this line to the line 15. Braking pressure is now reduced to an extent determined by the extent of displacement of the piston 19 to the right and thus to the volume of displaced fluid. For normal anti-lock operation the control valve 5 remains actuated for only the short time required to allow the braking pressure to fall sufficiently low for the wheel to re-accelerate. Once the control valve 5 is released, the pump 9, which is returning fluid from the reservoir 18 of the variable restrictor element 8 to the pressure line 14 via pressure line 21, gradually removes sufficient fluid from the reservoir 18 for the plunger 19 to return under its spring-loading towards its normal position, to increase the rate of braking pressure build-up. As indicated by the broken line 22, the pump 9 can be driven by the wheel 11.

From the foregoing description it will be appreciated that if the control valve 5 remains actuated, due to a malfunction in the system, fluid needed in lines 15 and 16 to produce braking pressure would continue to be diverted through the control valve 5, with the result that, with the system as so far described, braking pressure would fall to a dangerously low value. The lowest value to which the braking pressure can fall is, in fact, the value of the reservoir pressure, that is, the pressure of fluid in the reservoir 18. The value of the reservoir pressure will therefore be the lowest value of braking pressure which the anti-lock brake system can produce if the control valve 5 remains actuated due to a malfunction. In order to prevent the braking pressure falling to this dangerously low value, the fail-safe arrangement 1 is provided. The function of this fail-safe arrangement is to determine whenever the braking pressure has fallen nearly to the reservoir pressure and to over-ride the normal anti-lock operation of the system to allow normal brake application arising from the driver's braking action to be restored.

The fail-safe arrangement 1 comprises a chamber 23 in which a piston member 24 is slidably accommodated. An O-ring 25 provides a seal between the sides of the chamber 23 and the piston member 24. A pressure line 26 introduces fluid of braking pressure value into one end of the chamber 23 and a pressure line 27 introduces fluid of reservoir pressure value into the other end of the chamber 23. The fluid at braking pressure value introduced into the chamber 23 urges the piston member 24 into the position shown in which an O-ring 28 on the member seals off a central passage 29 from the chamber 23. This O-ring 28, with the piston member 24 in this position, also seals off a central surface area A1 of the piston member 24 from the fluid at reservoir pressure value, so that this fluid exerts a force over a lesser surface area A2 than the fluid of braking pressure value which exerts a force over the whole surface area A3 at the other side of the piston member 24.

For normal anti-lock operation of the system, the braking pressure which is significantly greater than the reservoir pressure, and which also acts over a larger surface area on the piston member 24, maintains the piston member 24 in the position shown, so that the fail-safe arrangement 1 remains inoperable. However, in the event that the control valve 5 remains actuated for a prolonged period, braking pressure will fall as aforesaid and its value will tend towards that of the reservoir pressure. Fluid at master cylinder pressure is introduced through the passage 29 and initially is effective only at the small central surface area A1 of the piston member 24. When the force exerted by the braking pressure becomes less than the total force exerted by the reservoir pressure and the master cylinder pressure, the piston member 24 is displaced from its normal position and fluid at master cylinder pressure locally increases the pressure to continue the displacement, this increase of pressure being effective over the total surface area (A1 + A2) of the piston member 24. Fluid at master cylinder pressure enters the pressure line 27 and passes through this line into pressure line 17 and the reservoir 18, through the opened control valve 5 and to the brake 10 to allow full brake application due to a driver's braking action to be restored.

In order to prevent the fluid at master cylinder pressure becoming effective at the surface area A1 of the piston member 24 during normal brake operation, a slide member 30 is provided in the passage 29. When a braking action is initiated, fluid at master cylinder pressure flows from the master cylinder 2 through pressure line 12 to pressure line 13 and this flow of fluid displaces the member 30 so that a restrictor 31 carried by the member 30 is positioned in a neck portion 32 of the passage 29. This restrictor 31 considerably reduces the fluid at master cylinder pressure which can be applied against the surface area A1 of the piston member 24 during this flow of fluid. Fluid at braking pressure is able to displace piston member 24 to the right, thereby ensuring that the seal at member 28 is complete. When the flow of fluid ceases, the member 30 is left 'floating' and the master cylinder pressure is applied only against the surface area A1 of the piston member 24.

In the system described above with reference to FIG. 1, the rate at which the braking pressure will fall when the anti-lock control valve 5 is actuated is determined by the parameters of the system, which could be too short in certain circumstances and thus result in the shortcoming referred to previously.

Figure 5:
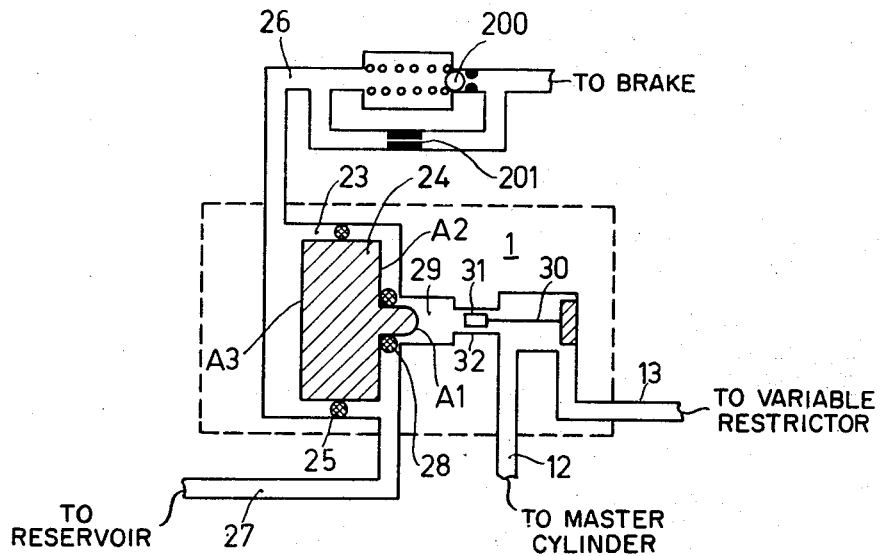
FIG. 5 shows diagrammatically the fail-safe arrangement of the anti-lock brake system shown in FIG. 1.

The rate at which braking pressure in chamber 23 of the fail-safe arrangement 1 falls consequent upon actuation of the anti-lock control valve of the system can be made longer by including in the pressure line 26 between the variable restrictor element 8 of the system and the chamber 23, as shown in FIG. 5, a restrictor means comprising a one-way valve 200 and a restrictor 201 connected in parallel therewith. Each time the braking pressure at the variable restrictor side of valve 200 exceeds the pressure in chamber 23, this valve opens, so that the new value of braking pressure is transferred to the chamber 23. If the braking pressure at the variable restrictor side of valve 200 suddenly falls (due to the anti-lock control valve of the system being actuated), then the pressure in chamber 23 will not fall at the same rate, as in the original system, but at a slower rate which is determined to a material extent by the restrictor 201 which by-passes the valve 200 to allow restricted flow of fluid under pressure from the chamber 23.

Figure 6:
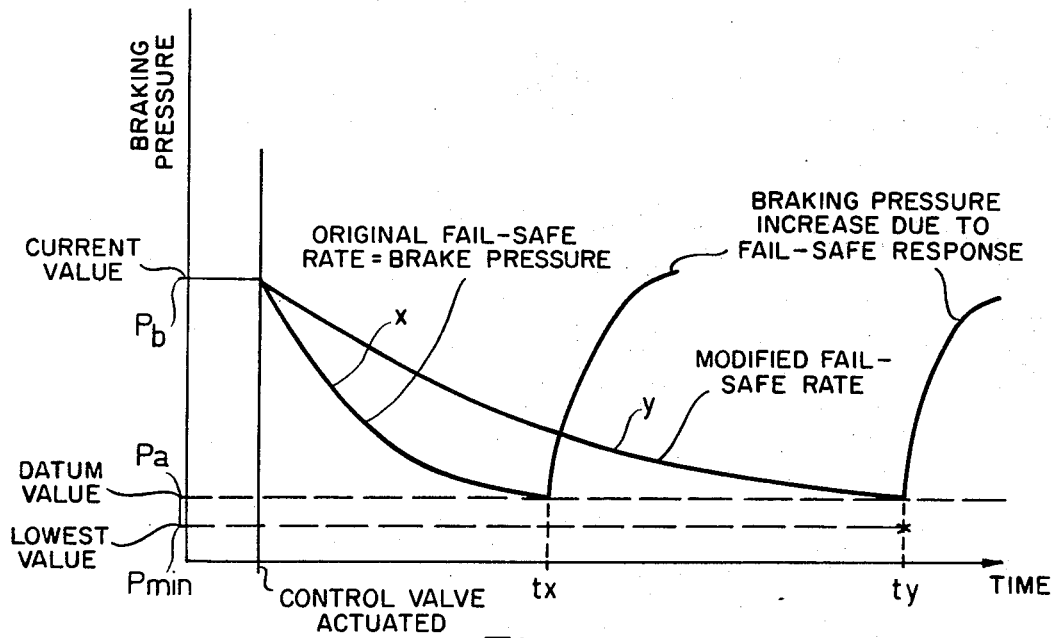
FIG. 6 shows explanatory braking pressure/time curves.

As shown in FIG. 6, in the curves of braking pressure $P_b$ against time, the datum value of braking pressure at which the fail-safe arrangement is responsive to cause braking pressure to be re-applied, following the relieving of braking pressure consequent upon actuation of the anti-lock control valve of the system, is reached at a relatively short time $tx$ in the original system and after a much longer time $ty$ with the addition of the restrictor means to the original system.

Figure 2:
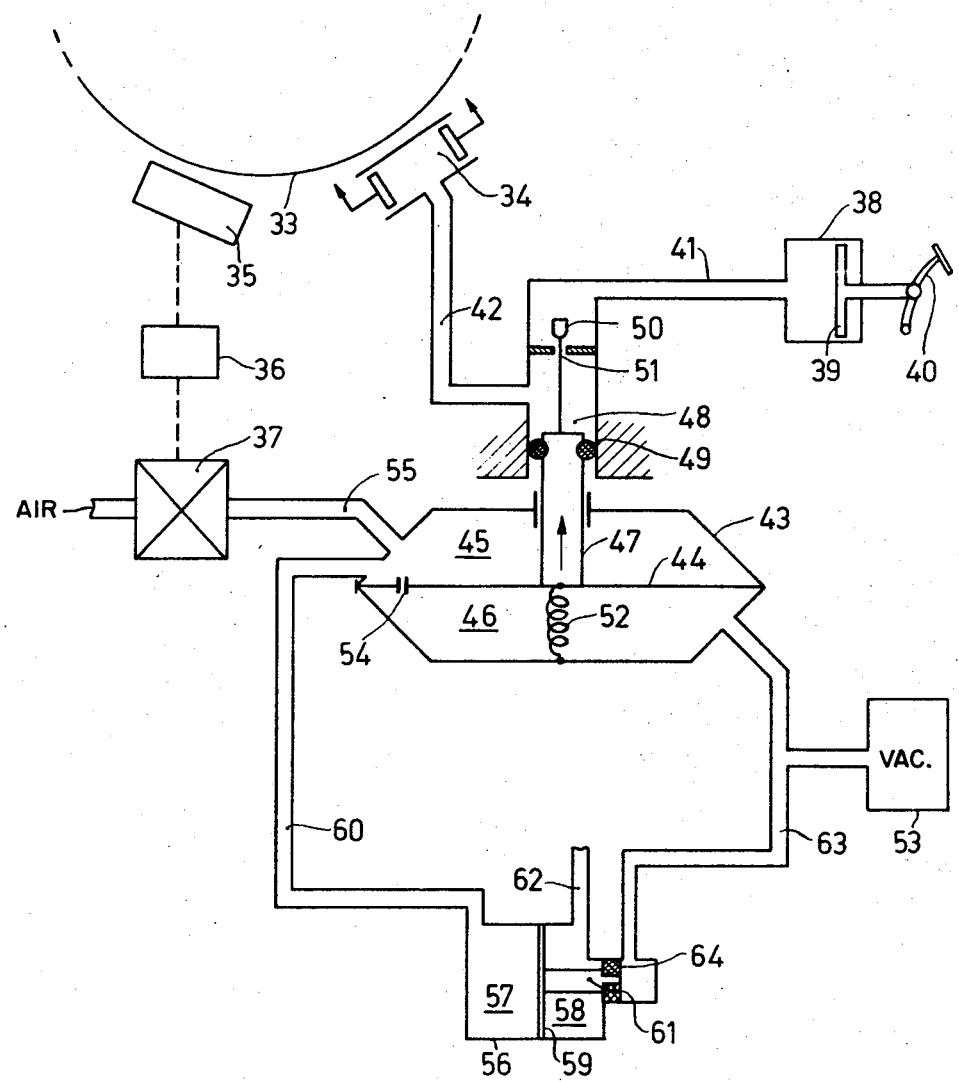

Turning now to FIG. 2 which shows diagrammatically a fail-safe arrangement according to the invention in an anti-lock vehicle brake system which includes a vacuum servo amplifier for effecting anti-lock operation when an anti-lock control valve of the system is actuated. This FIG. 2 shows a vehicle wheel 33, a wheel brake 34, a wheel movement sensor 35, an electrical control arrangement 36, an anti-lock control valve 37, and a master cylinder 38 having a piston 39 which is actuable by a brake pedal 40.

In operation of the system of FIG. 2 for normal brake application, fluid in pressure lines 41 and 42 is pressurized by the master cylinder 38 to an extent determined by a driver's braking action and this produces a corresponding braking pressure in the brake 34. If the driver's braking action is likely to cause skidding, this is detected by the wheel movement sensor 35 and electrical control arrangement 36, and the control valve 37 is actuated. As in the system of FIG. 1, the elements 35, 36 and 37 may be as described in the aforementioned co-pending application.

The vacuum servo amplifier of the system comprises an enclosure 43 which houses a diaphragm 44 that effectively divides the enclosure into two portions 45 and 46. The diaphragm 44 carries a piston 47 which extends through the wall of the enclosure portion 45 in a sealing and sliding manner and into a bore 48. An O- ring 49 provided on the piston 47 provides a sealing engagement between the piston 47 and the wall of the bore 48. The end of the piston 47 carries a valve 50 which is adapted to seal an orifice 51. There is provided in the lower portion 46 of the enclosure 43 a spring 52 which engages the diaphragm 44 to urge it upwardly (as seen in the drawing), so that the valve 50 is displaced from its seating in orifice 51, as shown. In this position of the valve 50, fluid pressure from the master cylinder 38 can pass between pressure lines 41 and 42 to actuate the brake 34, as aforesaid.

A vacuum reservoir 53 extends a vacuum into the enclosure portion 46 and a small aperture 54 in the diaphragm 44 extends this vacuum into the enclosure portion 45. The anti-lock control valve 37 is connected to the enclosure portion 45 by way of a connecting line 55 and when this control valve 37 is actuated, to effect anti-lock operation, air at atmospheric pressure passes through the control valve 37 into the enclosure portion 45. The effect of this air at atmospheric pressure in the enclosure portion 45 is to displace the diaphragm 44 against the spring 52 so that the piston 47 carried on the diaphragm 44 is displaced in a direction tending to seat the valve 50 in the orifice 51 and thereby restrict braking pressure from the master cylinder 38 to the brake 34. There is also an immediate relieving of braking pressure because displacement of the piston 47 increases the available volume of the bore 48 to the fluid in pressure line 42 and the bore 48.

If, due to a malfunction, the control valve 37 remains actuated for a prolonged period, then air at atmospheric pressure continues to flow into the enclosure portion 45 with the result that the valve 50 continues its displacement towards the orifice 51 so that braking pressure continues to be relieved and could fall to a dangerously low value. The aperture 54 in the diaphragm 44 is of insufficient size to equalize the pressures at opposite sides of the diaphragm 44, to prevent the fall in braking pressure.

The fail-safe arrangement provided in this system to prevent the braking pressure falling too low comprises an enclosure 56 which is divided into two portions 57 and 58 by means of a diaphragm 59 housed therein. A connecting line 60 extends between the enclosure portion 45 of the vacuum servo enclosure 43 and the enclosure portion 57 of the fail-safe enclosure 56. A piston 61 connected to the diaphragm 59 extends into the other enclosure portion 58 of the fail-safe enclosure 56, which latter enclosure portion has an opening 62 through which it is exhausted to air at atmospheric pressure. A connecting line 63 extends between the enclosure portion 46 of the vacuum servo enclosure 43 and the fail-safe enclosure portion 58, but this line 63 is normally sealed from this enclosure portion by means of a sealing member 64 carried on the piston 61.

When the control valve 37 is actuated, air at atmospheric pressure from the enclosure portion 45 enters the enclosure portion 57 of the fail-safe enclosure 56 via the connecting line 60 to displace the diaphragm 59 therein to the right (as seen in the drawing). As the pressure of this air increases, as the vacuum in the enclosure portion 45 is overcome, the force applied by it to the diaphragm 59 increases until it overcomes the force applied by the pressure of air at atmospheric pressure to the other side of the diaphragm 59. Due to the piston 61 connected to the diaphragm 59, the air at atmospheric pressure acts over a lesser surface area of the diaphragm than the air pressure from the enclosure portion 45, so that the latter air pressure will eventually displace the diaphragm 59 to the right before atmospheric pressure is reached. In so doing, the sealing member 64 carried on the piston 61 is moved to connect the line 63 with the enclosure portion 58 with the result that air at atmospheric pressure in this enclosure portion extends through this line 63 into the enclosure portion 46 of the vacuum servo enclosure 43 and is applied against the diaphragm 44 in opposition to the air applied to the other side of this diaphragm in the enclosure portion 45. Accordingly, these air pressures equalize so that the force applied by the spring 52 can become effective to displace the diaphragm 44 and so cause the valve 50 to unseat from the orifice 51 and thereby allow full master cylinder pressure to be re-applied to the brake 34.

Figure 3:
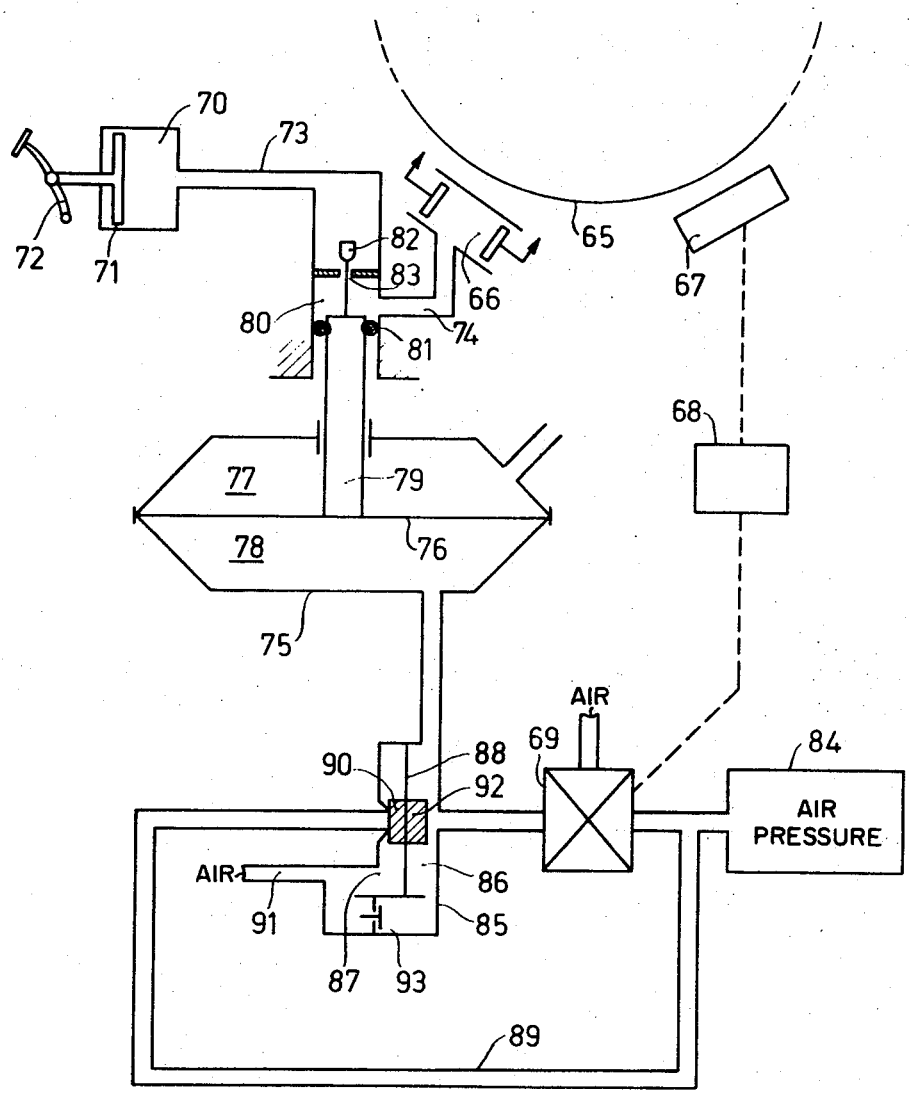

Turning now to FIG. 3 which shows diagrammatically a fail-safe arrangement according to the invention in an anti-lock vehicle brake system which includes an air pressure servo amplifier for effecting anti-lock operation when an anti-lock control valve of the system is actuated. This FIG. 3 shows a vehicle wheel 65, a wheel brake 66, a wheel movement sensor 67, an electrical control arrangement 68, an anti-lock control valve 69, and a master cylinder 70 having a piston 71 which is actuable by a brake pedal 72.

In operation of the system of FIG. 3 for normal brake application, fluid in pressure lines 73 and 74 is pressurized by the master cylinder 70 to an extent determined by a driver's braking action and this produces a corresponding braking pressure in the brake 66. If the driver's braking action is likely to cause skidding due to the wheel locking, this is detected by the wheel movement sensor 67 and electrical control arrangement 68, and the control valve 69 is actuated. As in the system of FIG. 1, the elements 67, 68 and 69 may be as described in the aforementioned co-pending application.

The air pressure servo amplifier of the system comprises an enclosure 75 which houses a diaphragm 76 that effectively divides the enclosure into two portions 77 and 78. The diaphragm 76 carries a piston 79 which extends through the wall of the enclosure portion 77 in a sealing and sliding manner and into a bore 80. An O-ring 81 provided on the piston 79 provides a sealing engagement between the piston 79 and the wall of the bore 80. The end of the piston 79 carries a valve 82 which is adapted to seal an orifice 83. Normally, full air pressure exists in the enclosure portion 78 to urge the diaphragm 76 upwardly (as seen in the drawing), so that the valve 82 is displaced from its seating in orifice 83 as shown. In this position of the valve 82, fluid pressure from the master cylinder 70 can pass between pressure lines 73 and 74 to actuate the brake 66, as aforesaid.

The air pressure in the enclosure portion 78 is provided by an air pressure source 84 via the anti-lock control valve 69 and a fail-safe arrangement 85. When the control valve 69 is actuated, to effect an anti-lock operation, it connects air at atmospheric pressure to the enclosure portion 78, instead of air pressure from the source 84. The effect of this is that the air pressure in the enclosure portion 78 starts to exhaust to atmosphere, so that the diaphragm returns (downwardly) towards a lower position. As a consequence, the piston 79 carried on the diaphragm 76 is displaced in a direction tending to seat the valve 82 in the orifice 83 and thereby relieves braking pressure as applied from the master cylinder 70 to the brake 66. There is also an immediate relieving of braking pressure because displacement of the piston 79 increases the available volume of the bore 80 to the fluid in pressure line 74 and the bore 80.

If, due to a malfunction, the control valve 69 remains actuated for a prolonged period, then the enclosure portion 78 will continue to exhaust towards atmosphere with the result that the valve 82 continues its displacement towards the orifice 83 so that braking pressure continues to be relieved and could fall to a dangerously low pressure value. The fail-safe arrangement 85 provided in this system to prevent the braking pressure falling too low for too long comprises two enclosure portions 86 and 87 between which is provided a diaphragm 88. The enclosure portion 86 is normally connected between the control valve 69 and the enclosure portion 78 of the air pressure servo 75, and the enclosure portion 87 is connected via a connecting line 89 to the air pressure source 84. This line 89 is normally sealed from the enclosure portion 87 by a sealing member 90, carried on the diaphragm 88, due to the latter being displaced to the left (as seen in the drawing) by the air pressure in the enclosure portion 86. The enclosure portion 87 also has a small opening 91 through which it is exhausted to air at atmospheric pressure.

When the control valve 69 is actuated, the enclosure portion 86 is exhausted towards atmospheric pressure through the control valve 69. Thus the force acting on the diaphragm 88 to urge it to the left is reducing. Air at atmospheric pressure is already applying a force over a major portion of the surface area of the diaphragm 88, to urge the latter to the right, and a further force produced by the air pressure in line 89 is also acting in the same direction over a minor portion of the surface area of the diaphragm, i.e., against the sealing member 90. These combined forces become effective to urge the diaphragm 88 to the right when the air pressure in the enclosure portion 86 is sufficiently reduced. Once the sealing member 90 disengages from the connecting line 89, the force of the air pressure from the source 84 acts against the whole surface area of the diaphragm which is thus displaced rapidly to the right until another sealing member 92 carried on it seals the enclosure portion 86 from the actuated control valve 69. The air pressure from the source 84 passes from the enclosure portion 87 to the enclosure portion 86 via a one-way flap valve 93 and thence to the enclosure portion 78 of the air pressure servo 75 to displace the diaphragm 76 (upwardly) and so cause the valve 82 to unseat from the orifice 83 and thereby allow full master cylinder pressure to be re-applied to the brake 66. The line 91 is not of sufficient diameter for the air pressure to dissipate through it to an extent preventing the operation just described taking place.

Figure 4:
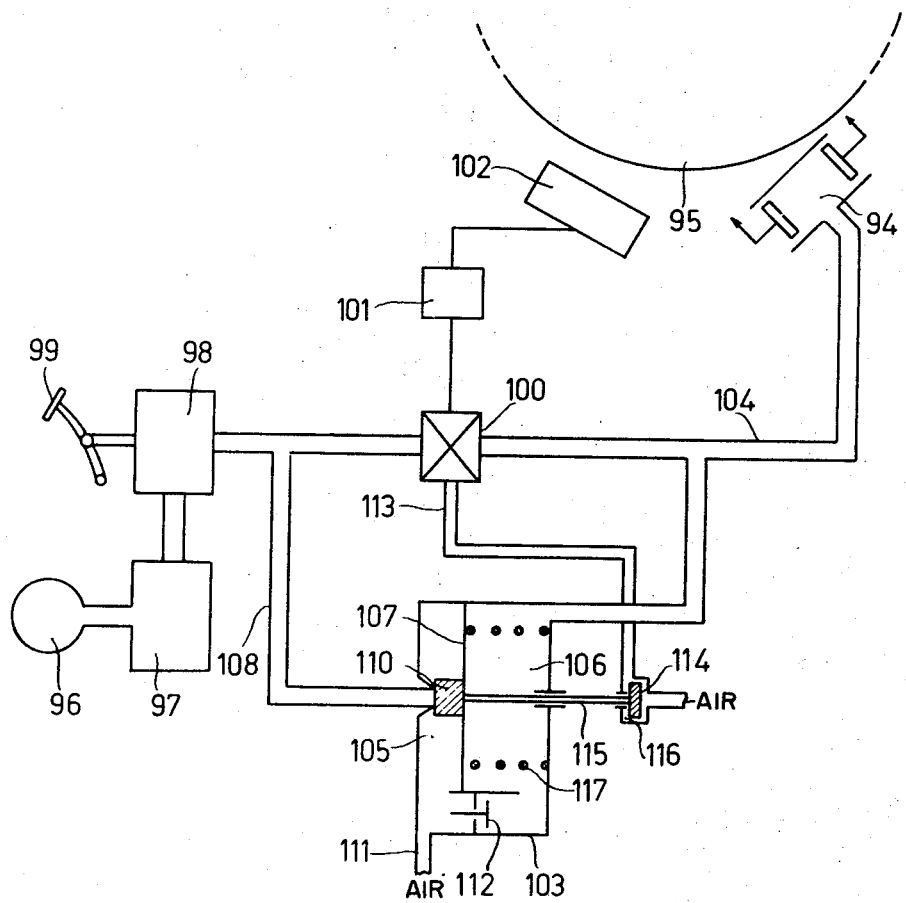

FIG. 4 shows diagrammatically a fail-safe arrangement according to the invention in an anti-lock vehicle brake system which is an air pressure system for operating a wheel brake 94 associated with a vehicle wheel 95. This system comprises an air pressure source 96, an air pressure reservoir 97, a modulator 98 which is controlled by a brake foot pedal 99, an anti-lock control valve 100, an electrical control arrangement 101, a wheel movement sensor 102, and a fail-safe arrangement 103.

In operation of the system of this FIG. 4 for normal brake application, the modulator 98 is actuated by the brake pedal 99 to an extent determined by a driver's braking action, and this allows a corresponding extent of air pressure to pass from the reservoir 97, through the modulator 98 and the anti-lock control valve 100 to the brake 94 to actuate the latter to effect braking. If the driver's braking action is likely to cause skidding due to the wheel locking, this is detected by the wheel movement sensor 102 and electrical control arrangement 101, and the control valve 100 is actuated. As in FIG. 1, the elements 100, 101 and 102 may be as described in the aforementioned co-pending application.

When the control valve 100 is actuated, to effect an anti-lock operation, it connects air at atmospheric pressure to a pressure line 104, instead of air pressure from the modulator 98, the effect of this being that air pressure in the brake 94 is reduced rapidly to cause an immediate relieving of braking pressure. If due to a malfunction, the control valve 100 remains actuated for a prolonged period, then air pressure in the brake 94 will continue to fall so that braking pressure continues to be relieved and could fall to a dangerously low pressure value. The fail-safe arrangement 103 provided in this system to prevent the braking pressure falling too low for too long comprises two enclosure portions 105 and 106 between which is provided a diaphragm 107. The enclosure portion 106 is connected to the pressure line 104 and the enclosure portion 105 is connected to the output side of the modulator 98 via a pressure line 108. This line 108 is normally sealed from the enclosure portion 105 by a sealing member 110, carried on the diaphragm 107, due to the latter being displaced to the left (as seen in the drawing) by the air pressure (from line 104) in the enclosure portion 106. The enclosure portion 105 also has a small opening 111 through which it is exhausted to air at atmospheric pressure.

When the control valve 100 is actuated, the air pressure in the enclosure portion 106 falls towards atmospheric pressure due to its connection with line 104 in which air pressure is reducing, as aforesaid. Thus the force acting on the diaphragm 107 to urge it to the left is reducing. Air at atmospheric pressure already applying a force over a major portion of the surface area of the diaphragm 107, to urge the latter to the right, and a further force produced by the air pressure in line 108 is also acting in the same direction over a minor portion of the surface area of the diaphragm 107, i.e., against the sealing member 110. These combined forces become effective to urge the diaphragm 107 to the right when the air pressure in the enclosure portion 106 is sufficiently reduced. Once the sealing member 110 disengages from the air pressure line 108, the force of the air pressure from the modulator 98 acts against the whole surface area of the diaphragm 107 which is thus displaced rapidly to the right and air pressure from the modulator 98 passes from the enclosure portion 105 to the enclosure portion 106 via a one-way flap valve 112 and thence via pressure line 104 to the brake 94 so that full modulator air pressure is re-applied to the brake. The line 111 is not of sufficient diameter for the air pressure from the modulator 98 to dissipate through it to an extent preventing the operation just described taking place. Also, in order to prevent the re-applied air pressure in line 104 from exhausting to atmosphere through the actuated control valve 100, a line 113 connected to the control valve 100 through which the exhausting takes place is sealed by a second sealing member 114 when the diaphragm 107 is displaced to the right. This sealing member 114 is carried at the end of a stem 115 which is secured to the diaphragm 107 and which extends in sealing manner through the wall of the enclosure portion 106 and through the wall of the enlarged portion 116 of the line 113 in which the sealing member 114 is located. A spring 117 normally urges the diaphragm 107 to the left (so that air pressure can be exhausted to atmosphere past the sealing member 114 during normal anti-lock operation. However, once the diaphragm 107 is displaced to the right, due to a malfunction, the force exerted by the spring 117 having been overcome, air pressure in line 113 holds the sealing member 114 in its sealing position to prevent air in line 113 from exhausting to atmosphere.

In each of the embodiments just described, recovery of the malfunction will allow normal anti-lock operation to take place, if necessary, in response to further braking action.

Although the invention has been exemplified in FIGS. 1 to 3, as applied to brake systems in which brake application is effected by directly acting master cylinder pressure, it is to be appreciated that the invention is equally applicable to servo-assisted master cylinder type systems.

An anti-lock vehicle brake system of the character referred to including a fail-safe arrangement according to the invention may be provided in respect of each road wheel of a vehicle, or two such systems may be provided for each of two front wheels of a vehicle with a third system provided jointly for the two rear wheels of the vehicle. The several systems in either case would share a common fluid pressure source.

What is claimed is:

1. An anti-lock vehicle brake system comprising a wheel brake, a source of fluid pressure, means for applying pressure from said source to said brake for operating same, an anti-lock control valve for relieving said brake pressure when actuated, means connected to said control valve for detecting wheel locking so as to actuate said control valve and thereby relieve braking pressure, a fail-safe arrangement for reapplication of brake pressure to said brake in the event of prolonged actuation of said anti-lock control valve so as to allow full brake pressure to be restored to said brake, comprising a chamber, a differential pressure member accommodated within said chamber for displacement between a normal position and an operative position in response to difference in fluid pressure acting on opposite ends thereof, said differential pressure member having first and second surface areas at one end thereof and a third surface area at the other end thereof opposite said first and second surface areas, said second surface area being larger than said first surface area and said third surface area being larger than said second surface area, said source of pressure connected to said chamber for establishing a first reference pressure at said third surface area of said pressure differential member, reference pressure means for establishing a second reference pressure at said second surface area of said pressure differential member, and a first connection extending between said anti-lock control valve and said chamber, said first connection being connected to said chamber at the side thereof having said second surface area of said pressure member, so that when the control valve is actuated fluid may be displaced into said first connection thereby progressively varying in value of said first reference pressure at said third surface area in proportion to the reduction of the fluid pressure at the wheel brake due to said control valve being actuated until said differential pressure member is displaced from its normal position to its operative position so that fluid pressure acting on said brake will be increased to full braking pressure as a result of said control valve remaining actuated and fluid being displaced through said first connection from said source of pressure to said brake.

2. The system as claimed in claim 1 wherein said control valve is connected in a pressure line for supplying fluid under pressure from said source of pressure to the brake, said control valve being operative to divert fluid from said pressure line when actuated so as to relieve braking pressure thereby preventing wheel locking, and wherein said first connection extending between said anti-lock control valve and said chamber forms a portion of a by-pass connecting said source of pressure with said control valve when said differential pressure member is in the operative position, said differential pressure member being arranged so as to seal off said by-pass connection when in its normal position and to unseal said by-pass connection to permit the application of fluid pressure therethrough and through the actuated control valve from said source of pressure to the brake when said pressure member is displaced to its operative position.

3. The system as claimed in claim 2, wherein said differential pressure member comprises a piston which is slidably accommodated in said chamber, and wherein said reference pressure means for establishing a second reference pressure comprises a fluid reservoir communicating at one side thereof with said chamber, said fluid reservoir further being connected via said first connection to said control valve for receiving fluid diverted from said pressure line when the control valve is actuated, the fluid pressure in said reservoir providing said second reference pressure at said second surface area of the differential pressure member through said first connection, and further comprising a second connection communicating between said chamber and said source of pressure for applying fluid pressure from said source of pressure to said third surface area of said differential pressure member, and a third connection for applying fluid pressure from said source of pressure to said first surface area of said differential pressure member, the fluid pressure from said source providing said first reference pressure, and a seal on said differential pressure member for isolating said third connection from said chamber when said member is in its normal position, said by-pass connection being formed by said first and said third connections when said member is displaced to its operative position to cause communication of said third connection with said chamber.

4. The system as claimed in claim 3, further comprising a fluid control device for causing said first reference pressure to fall at a slower rate than the rate at which braking pressure falls at the brake to relieve braking pressure when the control valve of the system is actuated.

5. The system as claimed in claim 4, wherein said fluid control device comprises a one-way valve in said second connection, and a restrictor element connected in a fluid connection in parallel with said one-way valve, said restrictor arranged so as to permit fluid pressure to pass to said third surface area of said differential pressure member, and to prevent such fluid pressure being relieved from that area, said restrictor element operating to relieve said fluid pressure at a rate determined thereby.

6. An anti-lock vehicle brake system comprising a wheel brake for applying brake pressure to said wheel to cause deceleration thereof, a fluid pressure source and connection therefrom to said brake for applying brake fluid thereto under pressure in response to braking action applied to said fluid pressure source, wheel movement sensing means for detecting wheel rotational movement and producing an output function as a result thereof, an anti-lock control valve located within the connection between said fluid pressure source and said brake and arranged for actuation in response to said output function so as to divert brake fluid from said brake to thereby relieve braking pressure so as to avoid wheel locking, a fail-safe mechanism comprising a chamber, a differential member slidably mounted within said chamber for displacement between a normal and operative position said differential pressure member comprising first, second and third surface areas, said first surface area being smaller than said second surface area and said second surface area being smaller than said third surface area, said first and second surface areas being located on one end of said member and said third surface area being located on an end opposite thereto, a fluid reservoir connected to said control valve for receiving the fluid diverted from said connection between said fluid pressure source and said brake when said control valve is actuated to relieve brake pressure, a first connection between said reservoir and said chamber on a side thereof so that the fluid pressure from said reservoir may be applied to said second surface area thereby providing one of two reference pressures, a second connection between said fluid pressure source and said chamber for applying fluid pressure to said third surface area of said differential pressure member, and a third connection from said fluid pressure source for applying fluid pressure to said first surface area of said differential pressure member, the pressure applied from said fluid pressure source thereby providing the other of said two reference pressures, said differential pressure member being caused to be displaced from its normal to its operative position when said first reference pressure falls below said second reference pressure, a by-pass connection being established between said first and third connections when said differential pressure member is displaced to its operative position so that fluid pressure may be applied therethrough from said fluid pressure source to said reservoir and through said actuated control valve so as to reapply brake pressure to said wheel brake and restore full braking pressure to the wheel.

* * * * *